United States Patent [19]
Chiu

[11] Patent Number: 5,329,436
[45] Date of Patent: Jul. 12, 1994

[54] REMOVABLE HEAT SINK FOR XENON ARC LAMP PACKAGES

[76] Inventor: David Chiu, 252 Indian Head Rd., Kings Park, N.Y. 11754

[21] Appl. No.: 130,313

[22] Filed: Oct. 4, 1993

[51] Int. Cl.$^5$ .......................... F21V 29/00; F28F 7/00; H01R 33/08
[52] U.S. Cl. ..................... 362/294; 362/373; 165/185
[58] Field of Search ............. 165/80.1, 80.2, 80.3, 165/185; 362/294, 373; 439/485, 486, 487

[56] References Cited

U.S. PATENT DOCUMENTS

| | | | |
|---|---|---|---|
| 3,586,100 | 6/1971 | Yasuda et al. | 165/185 X |
| 4,613,931 | 9/1986 | Messinger | 362/373 |
| 4,689,659 | 8/1987 | Watanabe | 257/722 X |
| 4,703,404 | 10/1987 | Helton, III et al. | 362/294 |
| 4,887,154 | 12/1989 | Wawro et al. | 362/294 X |
| 5,065,278 | 11/1991 | Schultz | 361/690 X |
| 5,219,221 | 6/1993 | Yamaka et al. | 362/294 |

FOREIGN PATENT DOCUMENTS 280109  11/1990  Japan ................................ 362/294

Primary Examiner—John Rivell
Assistant Examiner—L. R. Leo
Attorney, Agent, or Firm—Galgano & Burke

[57] ABSTRACT

A heat sink assembly for quickly coupling and uncoupling to an arc lamp package includes a front heat sink and a rear heat sink coupled by insulators. Both of the heat sinks and the insulators are longitudinally split. One insulator is provided with hinges and the other with a latching device so that the heat sink assembly can be opened and clamped closed easily. The interior of the heat sinks are profiled to conform to a known lamp package but with a slightly smaller diameter. The rear heat sink is preferably provided with a hole for the lamp package's locating pin and the front heat sink is provided with a light exit port. Rectangular and cylindrical embodiments of the invention are disclosed. In the rectangular embodiment, the cooling fins can be arranged either horizontally or vertically. A lever latching device and a knob latching device are also disclosed. When the latching device is unlocked, the heat sink assembly can be opened like a book and the lamp package installed in its profiled recesses. When the assembly is closed and the latching device is locked, the lamp package is clamped firmly between the split front and rear heat sinks so that each heat sink makes a good electrical and thermal connection with the lamp package.

14 Claims, 3 Drawing Sheets

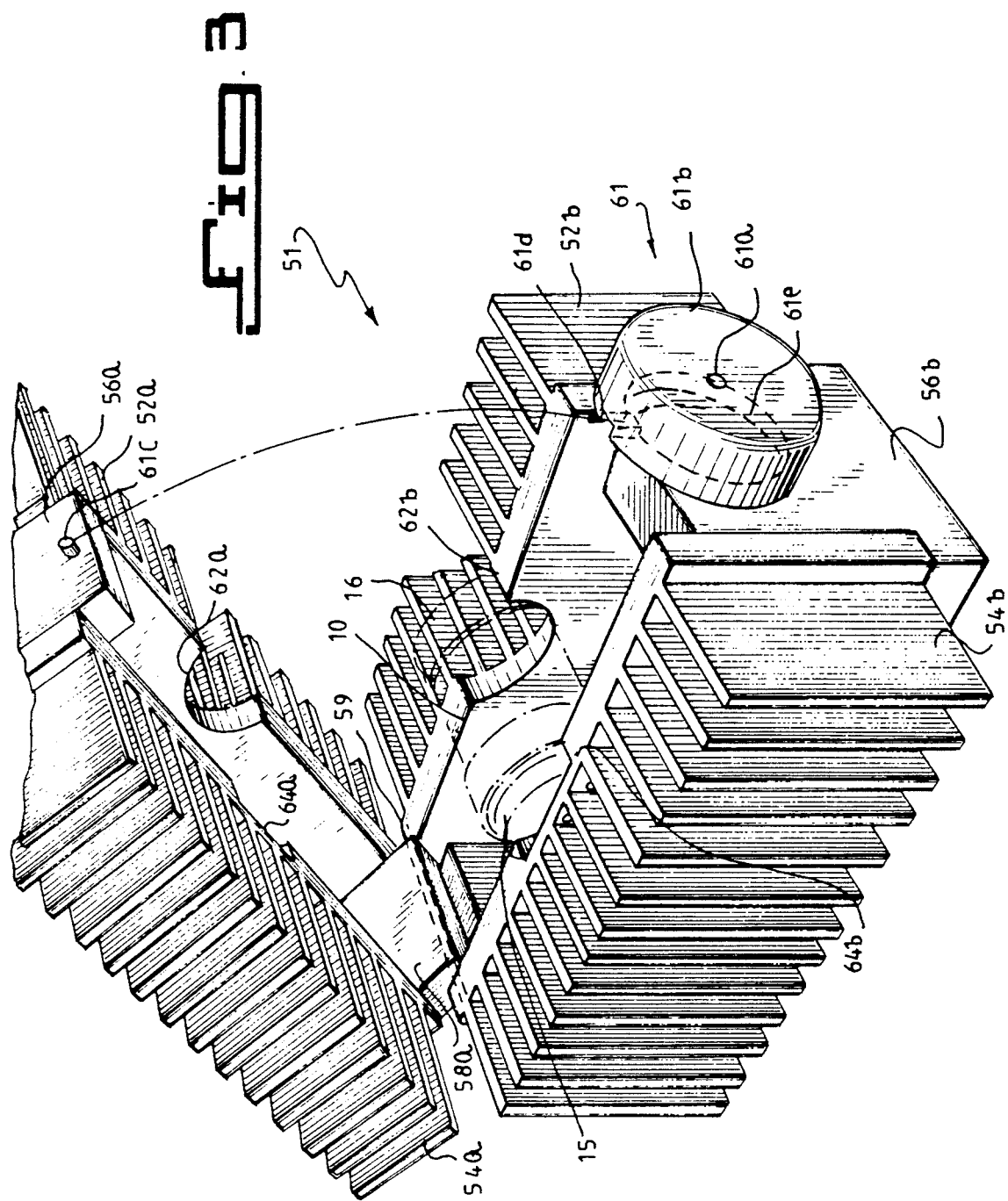

REMOVABLE HEAT SINK FOR XENON ARC LAMP PACKAGES

BACKGROUND OF THE INVENTION

1. Field of the Invention

The invention relates to arc lamps. More particularly, the invention relates to a removable heat sink assembly which clamps around a compact xenon lamp enclosed in a package with a fixed reflector.

2. State of the Art

Compact xenon lamps such as the one shown in prior art FIGS. 1a-1c are widely used in: fiber optic illumination, analytical instrumentation, spectroscopy, audio-visual systems, microscopy, character recognition, data projection, and searchlights. They are available in several power ratings (usually from 100-300 watts) in broadband ultraviolet, visible, and infrared from several manufacturers including Optical Radiation Corporation of Azusa, Calif. and ILC Technology of Sunnyvale, Calif. These lamps provide reliable and efficient sources of illumination combining xenon short arc technology with ceramic to metal sealing techniques.

The prior art lamp package 10 shown in FIGS. 1a-1c, comprises a high density alumina ceramic cylinder 12 having an anode ring 14 and a cathode ring 16. The rear end 15 of the lamp package is an integral electrically conductive portion of the anode ring 14 and is provided with threaded mounting holes 18 and a locating pin 20. Rear end 15 has a smaller diameter than the front end cathode ring 16. The front of the lamp is provided with a single crystal sapphire window 22 behind which the xenon arc 24 and silver coated reflector (not shown) are mounted. Although these lamps operate at a relatively low 12-14 volts, they require a relatively high 15-25 KV ignition voltage.

The lamp 10 is typically mounted in a lamp package holder constructed of high dielectric strength materials that prevent the presence of ignition potentials at external points. A flange with four equally spaced tapped holes is mounted at the light exit port for attaching beam forming optics, filters, apertures or gratings. The lamp holder includes a fan and gold alodined aluminum front and rear heat sinks for cooling the lamp package. Electrical connection to the anode and cathode of the lamp package is made through the heat sinks which are bolted to the lamp package and bolted to the power supply in the lamp package holder.

A disadvantage of the prior art lamp package holder is that it is difficult and time consuming to remove the lamp from the bolted heat sinks and the bolted holder when the lamp package to be changed. Most often, the entire lamp package holder is returned to the vendor for replacement rather than attempt disassembly of the lamp package holder.

SUMMARY OF THE INVENTION

It is therefore an object of the invention to provide an improved heat sink assembly for a xenon lamp package which is easy to attach to and remove from the lamp package.

It is also an object of the invention to provide a heat sink assembly which will fit into an existing lamp package housing.

It is another object of the invention to provide a heat sink assembly in which cooling fins can be arranged either horizontally, vertically, or radially.

It is still another object of the invention to provide a heat sink assembly with means for seating the lamp package in a defined position so that focal distance is preserved.

In accord with these objects which will be discussed in detail below, the heat sink assembly of the present invention includes a front heat sink and a rear heat sink coupled by insulators. Both of the heat sinks and the insulators are longitudinally separated into upper and lower portions. One insulator is provided with hinges and the other with a latching device so that the heat sink assembly can be opened and clamped closed easily. The interior of the heat sinks are profiled to conform to a known lamp package but with a slightly smaller diameter. The rear heat sink is preferably provided with a hole for the lamp package's locating pin and the front heat sink is provided with a light exit port. Rectangular and cylindrical embodiments of the invention are disclosed. In the rectangular embodiment, the cooling fins can be arranged either horizontally or vertically. A lever latching device and a knob latching device are also disclosed. When the latching device is unlocked, the heat sink assembly can be opened like a book and the lamp package installed in its profiled recesses. When the assembly is closed and the latching device is locked, the lamp package is pressed firmly between the split front and rear heat sinks so that each heat sink makes a good electrical and thermal connection with the lamp package.

Additional objects and advantages of the invention will become apparent to those skilled in the art upon reference to the detailed description taken in conjunction with the provided figures.

BRIEF DESCRIPTION OF THE DRAWINGS

FIG. 1b is a side view of the prior art xenon arc lamp package of FIG. 1a;

FIG. 1c is a front end view of the prior art xenon arc lamp package of FIG. 1a;

FIG. 2b is a rear end view of the embodiment of FIG. 2a;

FIG. 2c is a side view of the embodiment of FIG. 2a;

FIG. 3 is a perspective view of an embodiment similar to FIGS. 2a-2c, but with a knob latching device;

FIG. 4c is a side view of the embodiment of FIG. 4a; and

DETAILED DESCRIPTION OF THE PREFERRED EMBODIMENTS

Figure 1A:
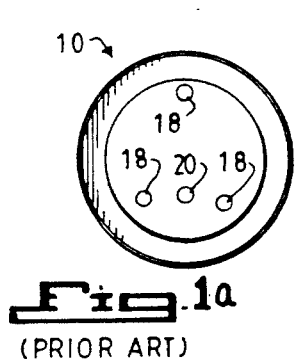
FIG. 1a is a rear end view of a prior art xenon arc lamp package.
Figure 1B:
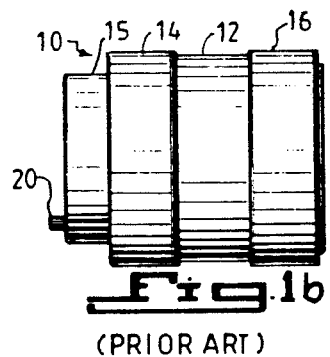
Figure 1C:
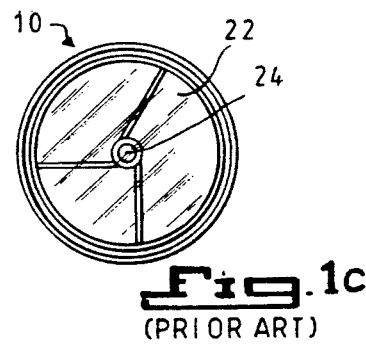

Turning now to FIGS. 2a-2d, a first embodiment of the heat sink assembly 50 generally comprises a front heat sink 52, a rear heat sink 54, connected by a pair of insulators 56, 58. As seen best in FIG. 2c, heat sink 52 comprises an upper portion 52a and a lower portion 52b. Heat sink 54 also comprises an upper portion 54a and a lower portion 54b. Insulators 56, 58 similarly comprise upper portions 56a, 58 a and lower portions 56b, 58b. The upper portion 52a of heat sink 52 is coupled to the upper portion 56a of insulator 56 by screw 53a and to the upper portion 58a of insulator 58 by screw 53c. The lower portion 52b of heat sink 52 is coupled to the lower portion 56b of insulator 56 by screw 53b, and to the lower portion 58b of insulator 58 by screw 53d. Similarly, the upper portion 54a of heat sink 54 is coupled to the upper portion 56a of insulator 56 by screw 55a, and to the upper portion 58a of insulator 58 by screw 55c. The lower portion 54b of heat sink 54 is coupled to the lower portion 56b of insulator 56 by screw 55b, and to the lower portion 58b of insulator 58 by screw 55d. The upper portion 58a of insulator 58 is coupled to its lower portion 58b by a hinge 59. The upper portion 56a of insulator 56 is removably coupled to its lower portion 56b a latching device 60.

In this embodiment, latching device 60 comprises a lower hinge pin 60a in the lower portion 56b of insulator 56, a latching arm 60b hingedly attached to the hinge pin 60a, and a latching pin 60c in the upper portion 56a of insulator 56. Latching arm 60b is provided with a hook portion 60d and an arm portion 60e. Those skilled in the art will appreciate that the movement of the arm portion 60e will cause the hooked portion 60d to engage or disengage the locking pin 60c to clamp or unclamp the upper portions 52a, 54a of the heat sinks 52, 54 to the lower portions 52b, 54b of the heat sinks.

Figure 2A:
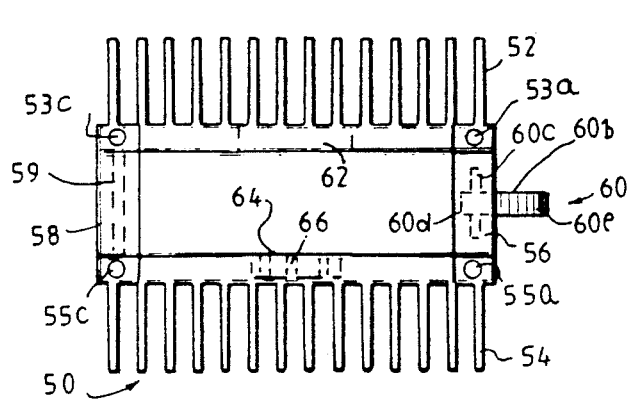
FIG. 2a is a top view of a first embodiment of the invention with vertical cooling fins and a lever latching device.
Figure 2C:
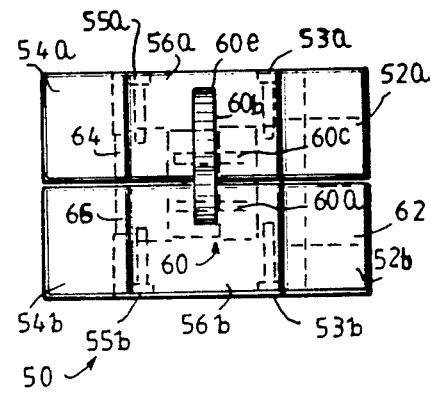
Figure 2B:
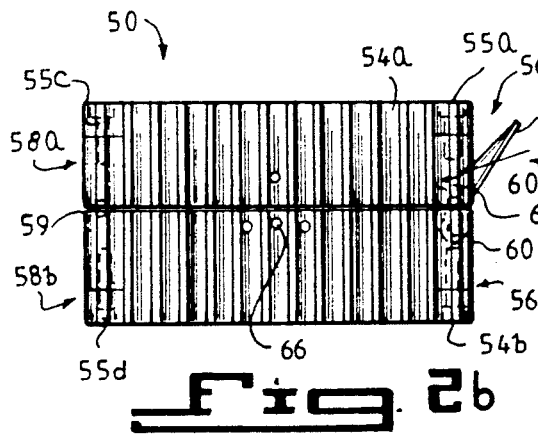
Figure 2D:
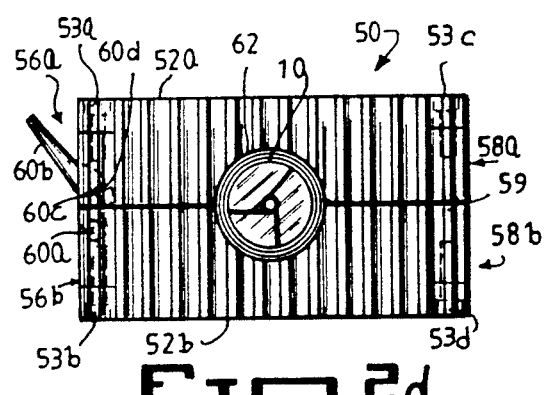
FIG. 2d is a front view of the embodiment of FIG. 2a with the prior art lamp package of FIGS. 1a-1c installed.
Figure 4A:
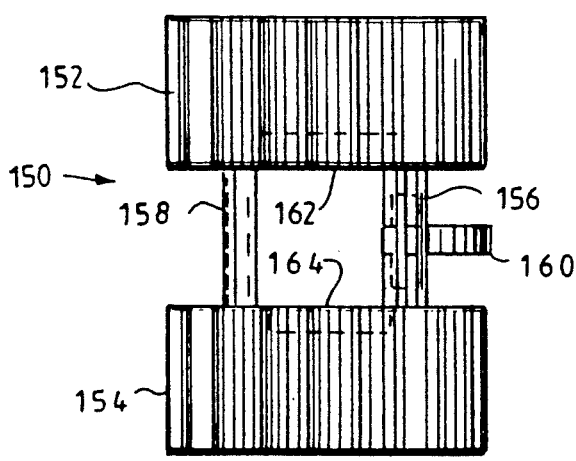
FIG. 4a is a top view of another embodiment of the invention having radially arranged cooling fins.
Figure 4B:
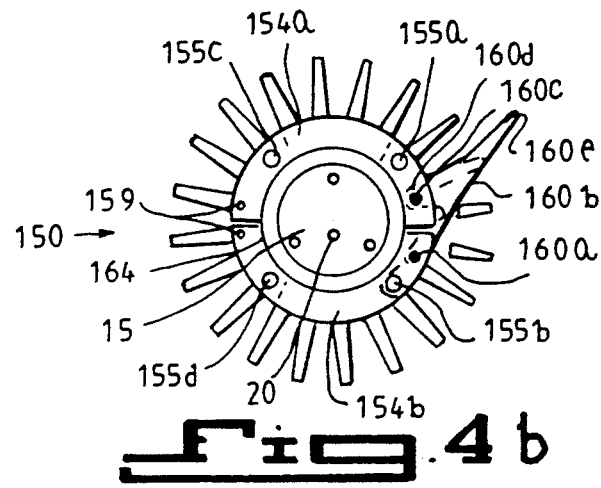
FIG. 4b is a rear end view of the embodiment of FIG. 4a with the prior art lamp package of FIGS. 1a-1c installed.
Figure 4C:
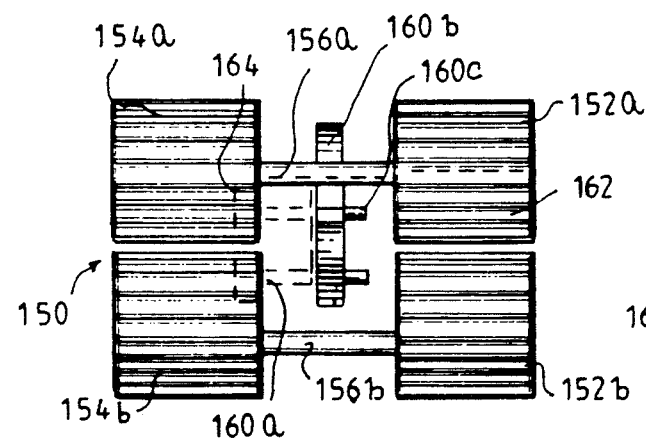
Figure 4D:
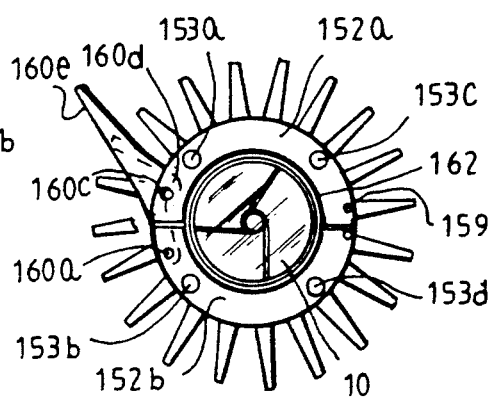
FIG. 4d is a front end view of the embodiment of FIG. 4a with the prior art lamp package of FIGS. 1a-1c installed.

As seen best in FIGS. 2a, 2b and 2d, heat sink 52, comprises a generally planar member with a plurality of orthogonal vertically aligned parallel equally spaced cooling fins which are interrupted in a central location for light exit port 62. Heat sink 54 comprises a similar member with similar cooling fins which are not interrupted. However, an interior portion of heat sink 54 is provided with a partial bore 64 and at least one bore 66.

As seen best in FIGS. 2a and 2c, light exit port 62 in heat sink 52 is a hole with a diameter slightly smaller than the cathode ring 16 of the lamp package 10 and the partial bore 64 is a circular well with a diameter slightly smaller than rear end portion 15 of the lamp package 10. Bore 66 is sized and located to accept the locating pin 20 on lamp package 10.

FIG. 3 shows a heat sink assembly 51 substantially the same as that described above except for the latching device 61. Here the latching device 61 comprises an axle pin 61a on the lower portion 56b of the insulator 56 holding a twistable knob 61b, and a locking pin 61c on the upper portion 56a of insulator 56. Twistable knob 61b is provided with a pin entry slot 61d communicating with an inner spiral groove 61e. When the twistable knob 61b is twisted so that pin entry notch 61d is facing the upper portion 56a of insulator 56, the heat sink assembly is unclamped and may be opened like a book as shown in FIG. 3. When the heat sink assembly is closed as shown in FIGS. 2a-2d, twisting the twistable knob 61b so that the locking pin 61c is engaged by spiral groove 61e will clamp the upper portions 52a, 54a of the heat sinks 52, 54 to the lower portions 52b, 54b of the heat sinks.

Those skilled in the art will therefore appreciate that the upper portions 52a, 54a of heat sinks 52, 54 may be hingedly separated from their lower portions 52b, 54b by opening the latching device 60 (61) as described above; whereupon the heat sink assembly 50 (51) may be opened like a book. With the heat sink assembly in the opened position, opening 62 is separated into upper portion 62a and lower portion 62b while opening 64 is separated into upper portion 64a and lower portion 64b. With the heat sink assembly in this opened position, a lamp package 10 may be inserted into the lower portions 62b, 64b of openings 62, 64 with the locating pin 20 entering bore 66. The upper portions 52a, 54a of the heat sinks may then be closed and the latching device 60 (61) locked so that the lamp package 10 is clamped between the upper and lower portions of the heat sinks as shown for example in FIG. 2d.

FIGS. 4a-4d show another embodiment of the heat sink assembly. This embodiment 150 is similar to the embodiments 50, 51 described above except that the heat sinks 152, 154 comprise generally cylindrical members with radially extending cooling fins. Consequently, insulators 156, 158 are arcuate members rather than planar members as described above. It will also be recognized that the coupling of the heat sinks to the insulators is accomplished by a similar number of screws 153a-153d and 155a-155d but that the direction and location of the screws will vary slightly to accommodate the cylindrical nature of this embodiment. Latching device 160 operates in substantially the same manner as latching device 60 described above.

There have been described and illustrated herein several embodiments of a heat sink assembly. While particular embodiments of the invention have been described, it is not intended that the invention be limited thereto, as it is intended that the invention be as broad in scope as the art will allow and that the specification be read likewise. Thus, while particular latching devices have been disclosed, it will be appreciated that other latching devices could be utilized. Also, while vertical and radial cooling fins have been shown, it will be recognized that horizontal, diagonal, and other types of fins could be used with similar results obtained. Moreover, while particular configurations have been disclosed in reference to insulators, it will be appreciated that other configurations could be used as well so long as an upper portion and a lower portion of the heat sinks are quickly opened and clamped closed to each other. Furthermore, while the heat sink assembly has been disclosed as having upper and lower portions, it will be understood that the terms upper and lower have meaning only with reference to the figures herein and that the heat sink assembly may be arranged ot have separate portions which are not properly "upper" and "lower".

It will therefore be appreciated by those skilled in the art that yet other modifications could be made to the provided invention without deviating from its spirit and scope as so claimed.

I claim:

1. A heat sink assembly for use with an arc lamp package, said heat sink assembly comprising:
   a) a first front heat sink portion having a left and right side;
   b) a second front heat sink portion having a left and right side;
   c) a first rear heat sink portion having a left and right side;
   d) a second rear heat sink portion having a left and right side;
   e) a first insulator portion having a front and back side, a front side of said first insulator portion being mechanically coupled to said right side of first front heat sink portion and said back side of said first insulator portion being mechanically coupled to said right side of said first rear heat sink portion;

f) a second insulator portion having a front and back side, said front side of said second insulator portion being mechanically coupled to said right side of second front heat sink portion and said back side of said second insulator portion being mechanically coupled to said right side of said second rear heat sink portion;

g) a third insulator portion having a front and back side, said front side of said third insulator portion being mechanically coupled to said left side of first front heat sink portion and said back side of said third insulator portion being mechanically coupled to said left side of said first rear heat sink portion;

h) a fourth insulator portion having a front and back side, said front side of said fourth insulator portion being mechanically coupled to said left side of second front heat sink portion and said back side of said fourth insulator portion being mechanically coupled to said left side of said second rear heat sink portion;

i) hinge means mechanically coupling said third insulator portion with said fourth insulator portion; and j) latch means for removably coupling said first insulator portion with said second insulator portion; wherein the arc lamp package is removably held between said first and second front heat sink portions and between said first and second rear heat sink portions by operation of said latch means.

2. A heat sink assembly according to claim 1, wherein:
said first and second front heat sink portions are provided with profiled cutouts for receiving front ends of the lamp packages; and
said first and second rear heat sink portions are provided with profiled cutouts for receiving a rear end of the lamp package.

3. A heat sink assembly according to claim 2, wherein:
said profiled cutouts of said first and second front heat sink portions include a light exit port.

4. A heat sink assembly according to claim 2, wherein:
one of said first and second rear heat sink portions is provided with a locating bore for receiving a locating pin on the rear end of the lamp package.

5. A heat sink assembly according to claim 2, wherein:
said profiled cutouts in said first and second front heat sink portions are substantially semi-circular.

6. A heat sink assembly according to claim 5, wherein:
said profiled cutouts in said first and second rear heat sink portions are substantially semi-circular and sized different from said profiled cutouts in said first and second front heat sink portions.

7. A heat sink assembly according to claim 1, wherein:
each of said heat sink portions comprises a generally planar member having a plurality of orthogonal cooling fins.

8. A heat sink assembly according to claim 7, wherein:
each of said insulator portions comprises a generally planar member substantially orthogonal to said planar members of said heat sink portions.

9. A heat sink assembly according to claim 1, wherein:
each of said heat sink portions comprises a generally semi-cylindrical member having a plurality of radial cooling fins.

10. A heat sink assembly according to claim 9, wherein:
each of said insulator portions comprises a generally arcuate member.

11. A heat sink assembly according to claim 1, wherein:
said latch means comprises a hook lever and a locking pin engageable by said hook lever.

12. A heat sink assembly according to claim 1, wherein:
said latch means comprises a rotatable knob having a spiral channel and a channel entry slot and a locking pin receivable by channel said entry slot and lockable by said spiral channel.

13. A heat sink assembly according to claim 1, wherein:
at least one of said first and second front heat sink portions makes an electrical contact with a first pole of the lamp package.

14. A heat sink assembly according to claim 11, wherein:
at least one of said first and second rear heat sink portions makes an electrical contact with a second pole of the lamp package.

* * * * *